UNITED STATES PATENT OFFICE.

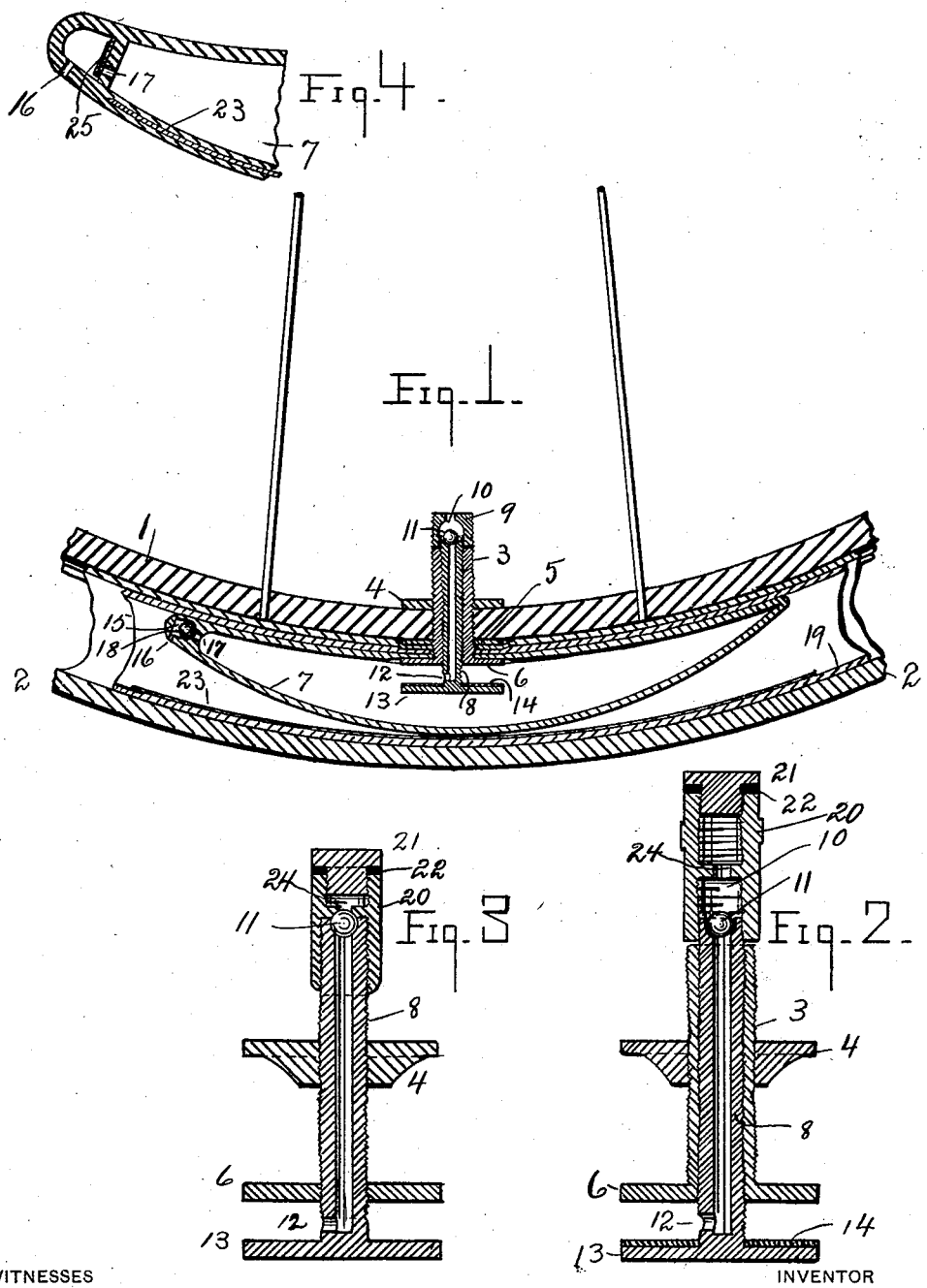

GEORGE WILLIAM MOWRY, OF ROCHESTER, NEW YORK, ASSIGNOR OF ONE-HALF TO HORACE M. CRAWFORD AND GEORGE E. REYNOLDS, OF SAME PLACE.

INFLATING DEVICE FOR BICYCLE-TIRES.

SPECIFICATION forming part of Letters Patent No. 592,014, dated October 19, 1897.

Application filed May 26, 1896. Serial No. 593,165. (No model.)

*To all whom it may concern:*

Be it known that I, GEORGE WILLIAM MOWRY, a resident of Rochester, in the county of Monroe and State of New York, have invented certain new and useful Improvements in Bicycles; and I do hereby declare the following to be a full, clear, and exact description of the invention, such as will enable others skilled in the art to which it pertains to make and use the same.

The invention relates to devices for introducing air into so-called "pneumatic" tire of vehicles. Its object is to effect this automatically or by means of the ordinary use of the machine, the weight of the rider being utilized to operate a pumping device.

The invention consists in the construction hereinafter described and particularly pointed out.

In the accompanying drawings, Figure 1 is a partial vertical section. Fig. 2 is an enlarged section of a modified detail. Fig. 3 is a similar view of a second modification, and Fig. 4 is an enlarged section of a modified valve.

Referring to Fig. 1, numeral 1 denotes the rim of a driving or other wheel of a vehicle. 2 denotes a hollow flexible tire inflatable with air. 19 denotes a lining for said tube. These parts may be of any desired or usual form and construction whether of bicycles or other vehicles.

3 denotes an externally-screw-threaded cylinder provided with an annular concavo-convex nut or plate 4 at its foot and also with nuts or plates 5 and 6 having the same general form, said plates 4 and 5 having a screw-threaded connection with cylinder 3, and plate 6 preferably fixed thereto.

7 denotes a compressible elastic bulb preferably of crescentic shape longitudinally and having transversely a circular form. Said bulb is made of rubber or like material and may be secured to the inside of the tire by cementing or otherwise. It is also secured between the plates 5 and 6, the former being adapted to be screwed down along the cylinder with the effect to clamp the inward walls of the tire and bulb together.

The plate 4 is screwed down on the cylinder 3 against the wheel-rim and clamps said rim between itself and the proximate plate 5. The plate or nut 5 is used to compress the elastic walls of the tire and bulb, so that they each constitute a packing for the other, and they are held by said nut in fixed relation independently of the nut 4, which holds them to the tire.

8 denotes a tube having external screw-threads engaging similar threads inside cylinder 3, so that said tube can be screwed into the cylinder and held adjustably therein. The tube is longer than the cylinder and projects through it at each end.

Upon the upper end of tube 8 is screwed a cap 9, having a chamber 10 with a valve-seat on each side, both above and below, and a ball-valve 11, adapted to close either end of a passage continuous with the valve-chamber and communicating on one side with the atmosphere and on the other with a bore of the tube 8. At 12 in the side of the foot of tube 8 is a port which communicates with the interior of the bulb. To close said port 12 and cut off communication between the atmosphere and the interior of the bulb, the tube is screwed up through the cylinder until said port is covered by the inner wall of the cylinder 3.

13 denotes a concavo-convex plate fixed to the tube 8 and adapted to be moved against the plate 6.

14 indicates an elastic packing on plate 13 to insure an air-tight joint when plates 6 and 13 are forced toward each other by screwing up the tube 8 through the cylinder 3.

15 denotes a valve-chamber having opposite ports 16 and 17, through which the interior of the bulb may communicate with the interior of the tire. 18 denotes a ball-valve adapted to close either port.

The rubber tire may consist of sections or be made of one piece, having its end cemented or otherwise joined. The bulb and other devices can be introduced into the tire before these tube ends are joined and cemented.

It is not essential that the bulb be situated at a joint or introduced in any particular way, neither is its form essential though preferably it is made of considerable length and of a form such as described. The valve 18 will preferably be situated at the rear of the bulb though it is not essential, neither is the particular form of either valve. Other parts also may be modified by mechanical skill without departing from the invention.

The operation is as follows: Assuming that it is desired to inflate the tire, the port 12 is opened by screwing the tube 8 down in the cylinder 3. The wheel being propelled the bulb 7 is compressed by the weight of the vehicle or the vehicle and its load whenever the bulb is rotated under the wheel center and between it and the ground or floor. The compression of the bulb automatically closes valve 11, and the pressure in the bulb exceeding that in the tire it opens valve 18, and air under such higher pressure passes into the interior of the tire. As soon as the compression of the bulb due to superincumbent weight is removed the valve 18 is closed by the pressure within the tire, and valve 11 is opened by atmospheric pressure aided by a spring, if necessary. It is, however, preferred to give the bulb the described form and it will have such suitable proportions that when nearly emptied into the tire by compressure its remaining contents will expand the bulb when relieved of external pressure sufficient to admit air thereto under atmospheric pressure.

In Fig. 2 is shown a tubular extension 20 of the tube 8, having a screw-thread connection therewith whereby when said tube is screwed up in cylinder 3 said extension can be moved down thereon to bring the perforated diaphragm 24 upon the valve to hold the same. 21 is a screw-threaded plug and 22 a packing, whereby the upper end of the extension 20 may be closed air-tight. Either one of the means for closing the air-inlet is adapted to act with a reasonable degree of certainty and others are not necessary but constitute a possible guard against accidental defects of workmanship which may be employed, if desired.

In the form shown in Fig. 3 the cylinder 3 is omitted. The valve is held upon its seat to close the air-inlet securely by a sleeve 20, having a diaphragm 24, such as above described, which in said Fig. 3 are shown screwed down to effect such closure.

In Fig. 4 a flap-valve 25 is indicated for closing the passage 17 of the pump-bulb, and a spring 23 is indicated as embedded in the wall of the bulb. This will defend the bulb from puncture and also aid in expanding the bulb, whereby the certainty of its action may be increased.

I am aware that an externally-threaded tube or cylinder has been secured to the tire by a flange and nut and that air-bulbs having the same general purpose as mine have also been proposed, and I do not claim such devices except as hereinafter pointed out.

My improvement relates to a removable bulb secured together with the wall of the tire to the rim as distinguished from those in which no separable bulb is used, whether the bulb is integral with the tire or the tire is itself relied upon without a distinct bulb or chamber. Further my bulb on the rim side thereof conforms to the inner wall of the tire and to the rim and is normally contiguous thereto throughout its whole length, having approximately crescentic form. This construction entirely prevents all bending of the wall of the bulb at the edge of the flange, whereby said bulb is held to the tire and rim, and therefore avoids breaking it at such point as has heretofore happened. It incidentally involves the use of a comparatively long bulb and confines all flexure of its walls to one side. By fitting one side of the bulb to the tire contiguous the rim the bulb is made less liable to displacement, and this security is further enhanced by an intermediate nut 5 holding the walls of the tire and bulb against flange 6, situated on the inner end of the air-inlet tube. By these means both the fracturing and the displacement of the separable bulb are avoided.

Another important feature of my improvement is the adjustable tube adapted to close the air-inlet valve and also the inlet 12. This is effected in the form indicated in Fig. 1 by drawing up tube 8 by means of its screw-threaded cap. In some cases a distinct stopper 21 may be used, as indicated in Figs. 2 and 3.

Having described my invention, what I claim is—

1. In combination the rim, the tire, a compressible bulb, a plate 13 fixed to a regulable tube 8 and an elastic cover 14 for such plate, said tube having an air-passage 12 at its foot adjacent the plate, substantially as described.

2. In a device for automatically filling the pneumatic tire of a vehicle, the compressible bulb situated within the tire and having a valved connection therewith and a similar connection with the atmosphere, a cylinder 3 passing through and fixed to the wheel-rim, tire and bulb, a tube within said cylinder having a packing adapted to positively close communication between the bulb and the atmosphere, and means for moving the tube endwise of the cylinder, substantially as described.

In testimony whereof I have signed this specification in the presence of two subscribing witnesses.

GEO. WILLIAM MOWRY.

Witnesses:
CHARLES W. McLAUGHLIN,
GEO. E. REYNOLDS.